United States Patent [19]

Smoll

[11] Patent Number: 5,685,698
[45] Date of Patent: Nov. 11, 1997

[54] METHOD AND APPARATUS FOR A PULSATILE BLOOD PUMP WITH NO HEMOLYSIS

[76] Inventor: Owen Clark Smoll, 2260 Monaco Dr., Oxnard, Calif. 93035

[21] Appl. No.: 681,997

[22] Filed: Jul. 30, 1996

[51] Int. Cl.$^6$ ........................................... F01C 1/02
[52] U.S. Cl. ........................... 417/50; 417/53; 623/3
[58] Field of Search ....................... 417/50, 53; 623/3; 604/16

[56] References Cited

U.S. PATENT DOCUMENTS

| | | | |
|---|---|---|---|
| 2,149,847 | 3/1939 | Kolin | 73/861.13 |
| 2,756,678 | 7/1956 | Collins | 417/50 |
| 2,997,013 | 7/1961 | Rice. | |
| 3,045,599 | 7/1962 | Carlson, Jr. et al. | 417/50 |
| 3,066,607 | 12/1962 | Cole | 417/50 |
| 3,206,768 | 9/1965 | Preston | 623/3 |
| 3,219,851 | 11/1965 | Kidwell | 417/50 |
| 3,568,214 | 3/1971 | Goldschmied | 623/3 |
| 3,957,389 | 5/1976 | Rafferty et al. | |
| 4,507,048 | 3/1985 | Belenger et al. | |
| 4,589,822 | 5/1986 | Clausen et al. | |
| 5,017,103 | 5/1991 | Dahl. | |
| 5,249,990 | 10/1993 | Laukien. | |
| 5,333,444 | 8/1994 | Meng. | |
| 5,352,139 | 10/1994 | Laukien et al. | |
| 5,417,119 | 5/1995 | Smoll | 73/861.12 |

OTHER PUBLICATIONS

V.C. Roberts, "Magnethydrodynamic Pumping of Blood", Medical and Biological Engineering, vol. 10, pp. 57–57 (copy located in class 623, subclass 3), Jan. 1972.

Series 230 "Compact Precision Bench Top High Voltage Power Supplies", by Bertan, Date Unknown.

Series 205B/206B; Series 210; CRT-30 and CRT-50 "16-bit Binary Programming Plug-In Card For High Voltage Power Supplies" by Bertan, date unknown.

*Primary Examiner*—Charles G. Freay
*Attorney, Agent, or Firm*—Robert E. Bushnell, Esq.

[57] ABSTRACT

An apparatus and method for pumping blood using an ion propulsion technique without causing hemolysis. A pulsatile blood pump has transducer for housing a "C" shaped magnet providing a constant magnetic field between the north and south poles of the magnet, a tray slider assembly insertable into a cavity of the transducer, and a disposable insert for insertion into an extracorporeal circuit, the disposable insert comprising a central section having a rectangular outer surface and a constant tubular bore, the central section having a first electric field plate and a second electric field plate disposed on diametrically opposite sides of the outer surface of the central section, the first and second electric field plates being respectively connected to negative and positive terminals of a voltage source for generating an electric field between the first and second electric field plates. A Lorentz force is applied to ions of the blood within the disposable insert in response to the generated electric field which is perpendicular to the magnetic field thus causing the blood to be pumped through the extracorporeal circuit.

14 Claims, 7 Drawing Sheets

METHOD AND APPARATUS FOR A PULSATILE BLOOD PUMP WITH NO HEMOLYSIS

BACKGROUND OF THE INVENTION

(1) Field of the Invention

The present invention relates to an apparatus and method for pumping blood, and further to an apparatus and method for pumping blood using an ion propulsion technique without causing hemolysis.

(2) Description of the Prior Art

It is known to pump or propel fluids using various techniques, such as mechanical pumps, centrifugal pumps or electromagnetic pumps. Usually, the method used for pumping a number of fluids is not particularly important. The handling of biological fluids, however, requires a great deal of care, especially when pumping blood because of the danger of blood hemolysis and thrombus formation.

Electromagnetic pumps are used for pumping conductive fluids or liquid metals based on the well known principle of Faraday's left hand rule to produce a Lorentz force on the charge carriers, i.e., ions. When a flux $\beta$ and current I are flowing perpendicular to one another and are transversely applied to a conductive fluid or liquid metal in a conduit, a Lorentz force F mutually perpendicular to the flux and current is produced causing the fluid or liquid metal to flow. Examples of electromagnetic pumps are discussed in the following U.S. patents: Collins U.S. Pat. No. 2,756,678; Rice U.S. Pat. No. 2,997,013; Laukien U.S. Pat. No. 5,249,990; and Meng U.S. Pat. No. 5,333,444. The electromagnetic pumps to Rice, Laukien, and Meng are used to propel a vessel in salt water. Since the pipe or conduit is open ended on both ends and fixed to a movable vessel, the Lorentz force generated on the ionic salt water causes the vessel to be propelled by a thrust of a magnitude directly proportional to the magnetic field strength and the current density. The electromagnetic pump to Collins, however, is stationary, thus the fluid is forced through a path according to the magnetic field strength and the current density. None of the above mentioned electromagnetic pumps are disclosed as being used for pumping blood.

The medical field has been using centrifugal pumps to pump blood without causing significant damage to the blood, e.g., hemolysis. Examples of these centrifugal pumps are discussed in the following U.S. patents: Rafferty et al. U.S. Pat. No. 3,957,389; Belenger et al. U.S. Pat. No. 4,507,048; Clausen et al. U.S. Pat. No. 4,589,822; and Dahl U.S. Pat. No. 5,017,103. These pumps are driven by internal and external electric motors or by internal permanent magnets and an externally applied rotating magnetic field. These centrifugal pumps are intended to pump blood without significant damage to the blood, but the impellers therein, as well as other components of these centrifugal pumps, do cause some damage.

Since blood is also a conductive fluid, I have adopted the use of an electromagnetic pump, which has no moving parts, for pumping blood, instead of the currently used centrifugal pump.

SUMMARY OF THE INVENTION

It is an object of the present invention to provide an apparatus and method for pumping blood without causing damage to the blood.

It is another object of the present invention to provide an apparatus and method for pumping blood using a force generated by the transverse perpendicular application of a magnetic field and an electric field on the blood in a predetermined path.

It is yet another object of the present invention to provide an apparatus and method for accurately controlling the flow of blood through a path by maintaining proper blood pressure levels when using the electromagnetic pump according to the principles of the present invention.

These and other objects are achieved, according to the present invention, by using an ion propulsion blood pump to pump the blood at a desired rate and pressure, an electromagnetic flow transducer as disclosed in my U.S. Pat. No. 5,417,119 and incorporated herein by reference, the transducer being positioned downstream from the pump, and a bioconsole connected to the pump and transducer. The bioconsole measures the blood flow rate passing through the transducer and controls the pump. A more detailed description of the invention will be described below.

BRIEF DESCRIPTION OF THE DRAWINGS

A more complete appreciation of this invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE PREFERRED EMBODIMENTS

In the following detailed description, many specific details are set forth to provide a more through understanding of the present invention. It will be apparent however, to those skilled in the art, that the present invention may be practiced without these specific details. In other instances, well known circuits have not been described so as not to obscure the present invention.

Figure 1:
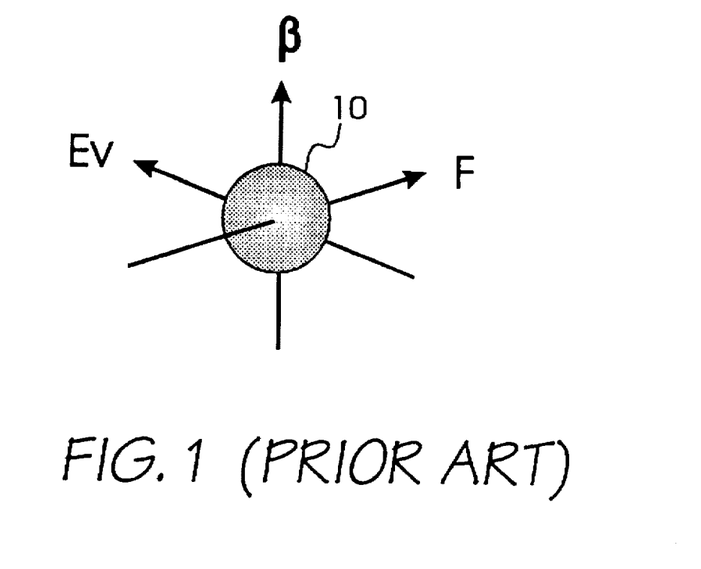
FIG. 1 is an illustration of Lorentz's law of force on a charged particle.

Referring now to FIG. 1, a magnetic field $\beta$ is applied to a charge carrier 10 in a first direction and an electric field $E_v$ is applied to charge carrier 10 in a second direction, perpendicular to the first direction, thus creating a Lorentz force F on charge carrier 10 in a third direction perpendicular to the first and second directions. Accordingly, charge carrier 10 will move in the third direction in response to the Lorentz force F.

Figure 2:
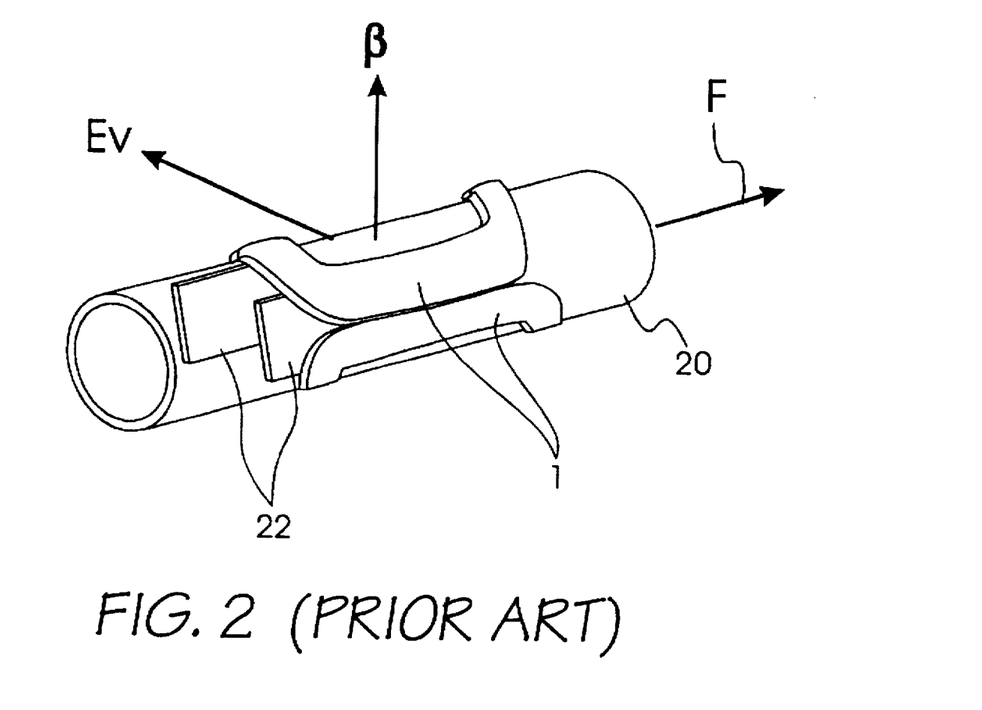
FIG. 2 is a perspective representation of a conventional magnetic hydrodynamic propulsion unit for water vehicles.

A magnetic hydrodynamic propulsion unit, shown in FIG. 2, includes a pipe 20 having a pair of magnetic saddle coils 1 disposed on opposite outer sides thereof and a pair of electric field electrodes 22 arranged inside the tube of pipe 20. Electrodes 22 are connected to a voltage source and are disposed on diametrically opposite sides of the inside of pipe 20 and extend in the axial direction of pipe 20. Salty sea water flows through pipe 20, and when saddle coils 1 are excited, a magnetic field β is applied to the ions of the salt water in a first direction. Electrodes 22 produce an electric field $E_y$, which is applied to the ions of the salt water in a second direction, perpendicular to the first direction, thus creating a Lorentz force F on the ions of the sea water in a third direction perpendicular to the first and second directions, where the third direction is the axial direction of pipe 13. Accordingly, salt water will move in the axial direction in response to the Lorentz force F.

Figure 3:
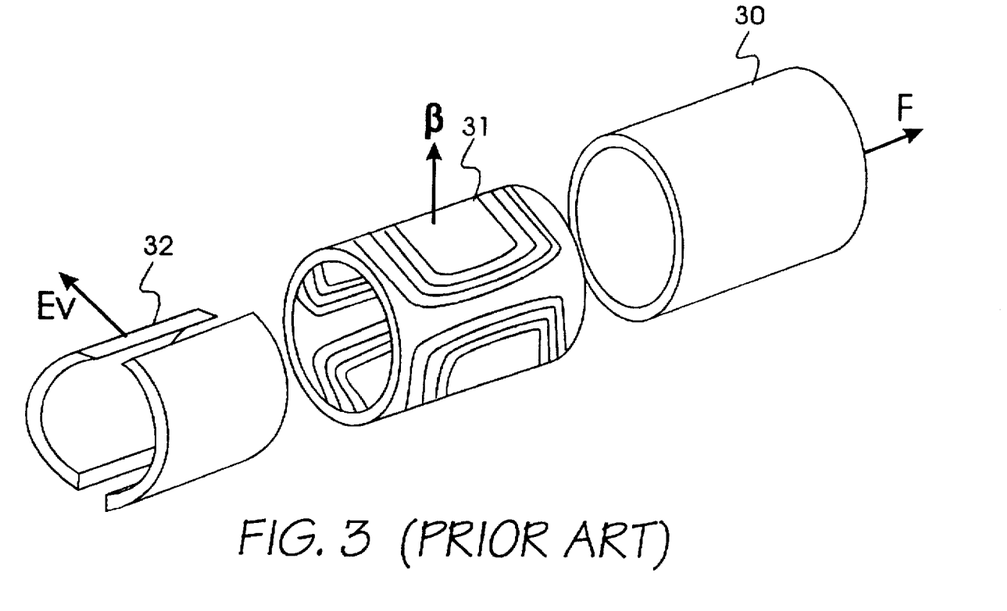
FIG. 3 is an exploded view of a conventional electromagnetic drive unit for an electromagnetic thruster in a propulsion system for marine vehicles.

An electromagnetic drive unit shown in FIG. 3 includes a cryogenic dewar 30 which encases superconducting magnets 31 and forms a duct. A pair of electrodes 32 are diametrically disposed along opposite sides of the inside surface of the formed duct. Sea water flows through the duct, and when superconducting magnets 31 are excited, a magnetic field β is applied to the ions of the sea water in a first direction. Electrodes 32 produce an electric field $E_y$, which is applied to the ions of the sea water in a second direction, perpendicular to the first direction, thus creating a Lorentz force F on the ions of the sea water in a third direction perpendicular to the first and second directions, where the third direction is the axial direction of the duct. Like the magnetic hydrodynamic propulsion unit, shown in FIG. 2, the sea water in the electromagnetic drive unit, shown in FIG. 3, will move in the axial direction in response to the Lorentz force F.

The devices of FIGS. 2 and 3 are intended to move a large marine vehicle and thus create a large Lorentz force on the charge carriers, i.e., ions. Additionally, the electrodes are in the fluid path making contact with the conductive fluid. Accordingly, neither device is suitable for use in propelling blood because they would cause significant damage thereto.

Figure 4:
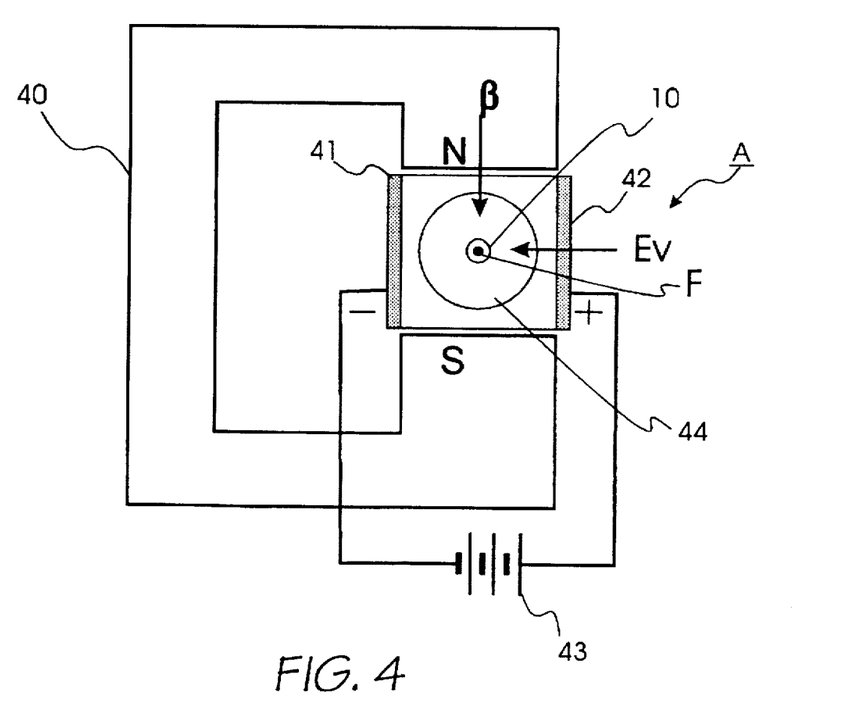
FIG. 4 is a cross sectional view of a pulsatile blood pump using ion propulsion technology and constructed according to the principles of the present invention.
Figure 5:
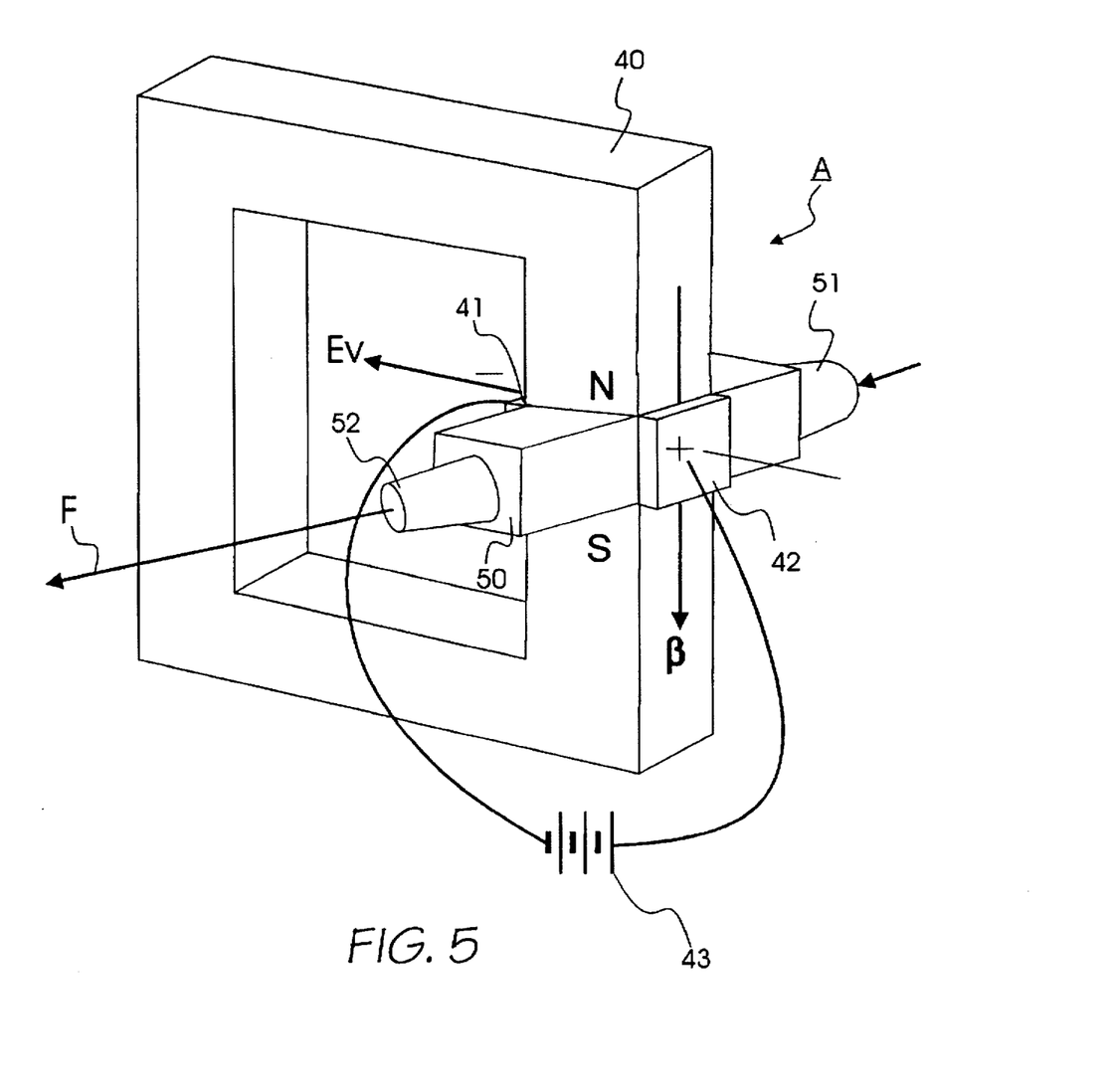
FIG. 5 is a perspective view of the pulsatile blood pump using ion propulsion technology and constructed according to the principles of the present invention.

Referring now to FIGS. 4 and 5, the pulsatile blood pump A incorporates a disposable insert having a rectangular body portion 50 and a pair of conical shaped tube ends 51 and 52 extending from either end of a body portion 50 for connecting the insert in the path, i.e., extracorporeal circuit, of a conductive fluid, i.e., blood. The disposable insert is formed by a plastic injection molding process using a material called LEXAN made in pellet form by the General Electric Company. Bore 44 has a constant diameter through tube ends 51 and 52 and through body portion 50. Two diametrically opposed electric field plates 41 and 42 are attached to the respective outer side walls of body portion 50. Field plates 41 and 42 are respectively connected to the negative and positive terminals of a voltage source 43 and thus generate an electric field in the direction shown by vector arrow $E_y$. A "C" shaped magnet 40 having the shown orientation of polarities generates a magnetic field in the direction shown by vector arrow β. Magnetic field β is applied to a charge carrier 10 in a first direction and electric field $E_y$ is applied to charge carrier 10 in a second direction, perpendicular to the first direction, thus creating a Lorentz force F on charge carrier 10 in a third direction perpendicular to the first and second directions. The third direction is illustrated by vector arrow F. Accordingly, blood will flow in the third direction in response to the Lorentz force F.

According to the principles of the present invention, the magnetic field strength will remain constant, and the flow mean level of the blood is varied by varying the electric field power supply. Controlling the flow mean level of the blood will be discussed with respect to FIG. 7.

Figure 6:
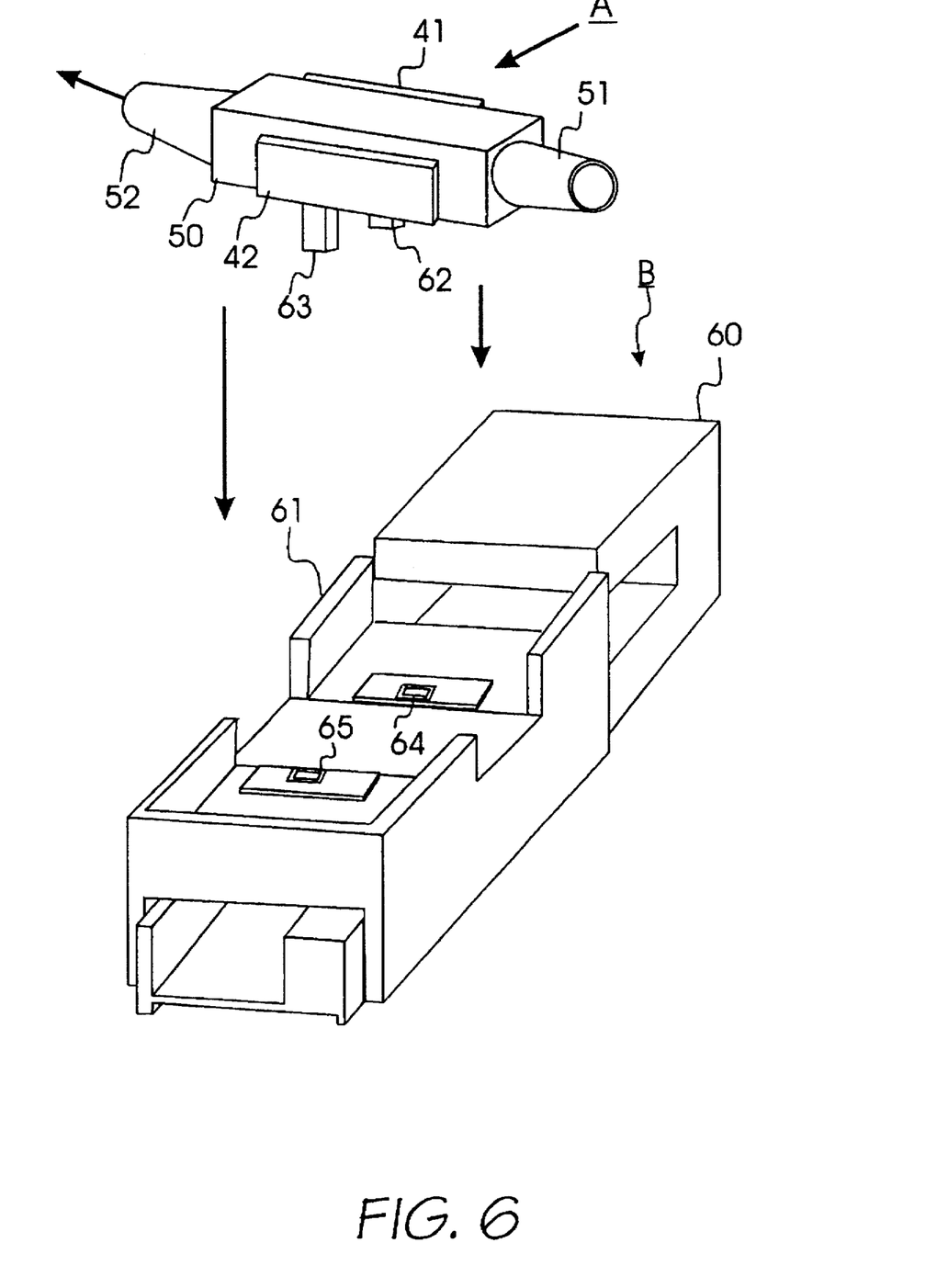
FIG. 6 is a partially exploded perspective view of the pulsatile blood pump, transducer and tray of the present invention.

The pulsatile blood pump discussed with respect to FIGS. 4 and 5, will now be further discussed with respect to FIG. 6. A transducer B having a housing 60 encases "C" shaped magnet 40. Field plates 41 and 42, of blood bump A, each have a prong 62 and 63, respectively, extending therefrom, which are to be inserted into sockets 64 and 65, respectively, in tray 61 in order to connect field plates 41 and 42 to the negative and positive terminals of voltage source 43. Tray 61 is slidably engaged with housing 60 to enable blood pump A to be positioned between the positive and negative poles of "C" shaped magnet 40 in housing 60.

Figure 7:
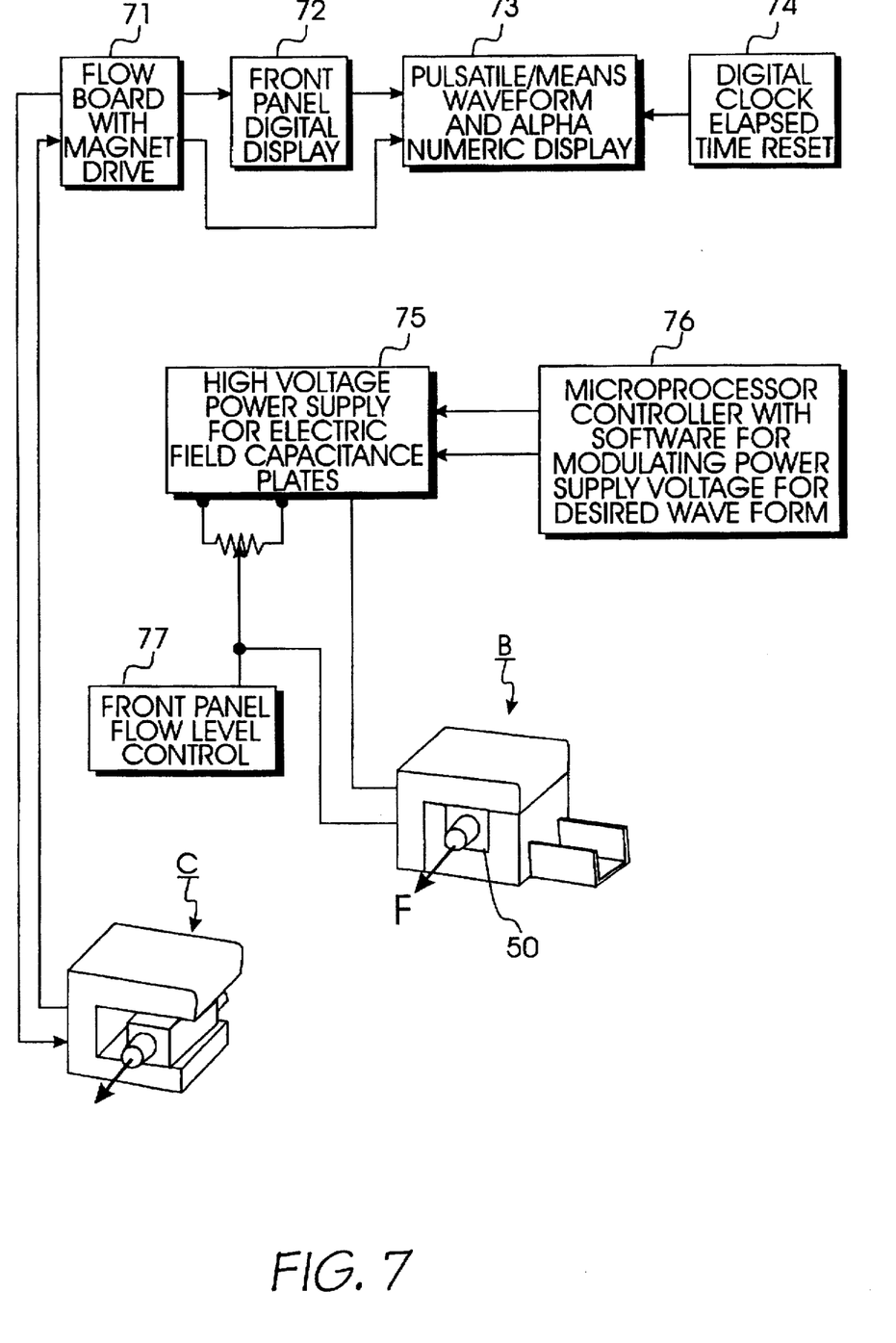
FIG. 7 is a block diagram illustrating a pump console for controlling the pump of FIGS. 4 and 5 according to the principles of the present invention.

Referring now to FIG. 7, blood pump A is shown in a mounted position within transducer B and upstream from an electromagnetic flow transducer C, described in my U.S. Pat. No. 5,417,119, in a path having blood flowing in the direction indicated by force arrow F. A voltage proportional to the velocity of blood flow, and therefore directly proportional to the volume rate of flow of blood passing through electromagnetic transducer C is input to flow board with magnetic drive unit 71.

Flow board with magnetic drive unit 71 outputs a magnetic drive excitation for the electromagnet housed in electromagnetic flow transducer C, and, in response to the voltage generated by electromagnetic transducer C, an analog DC voltage to drive a three digit segmented display on front panel digital display unit 72, and an analog pulsatile blood flow signal to a pulsatile/mean waveform and alphanumeric display unit 73 in order to display a pulsatile waveform.

Figure 8:
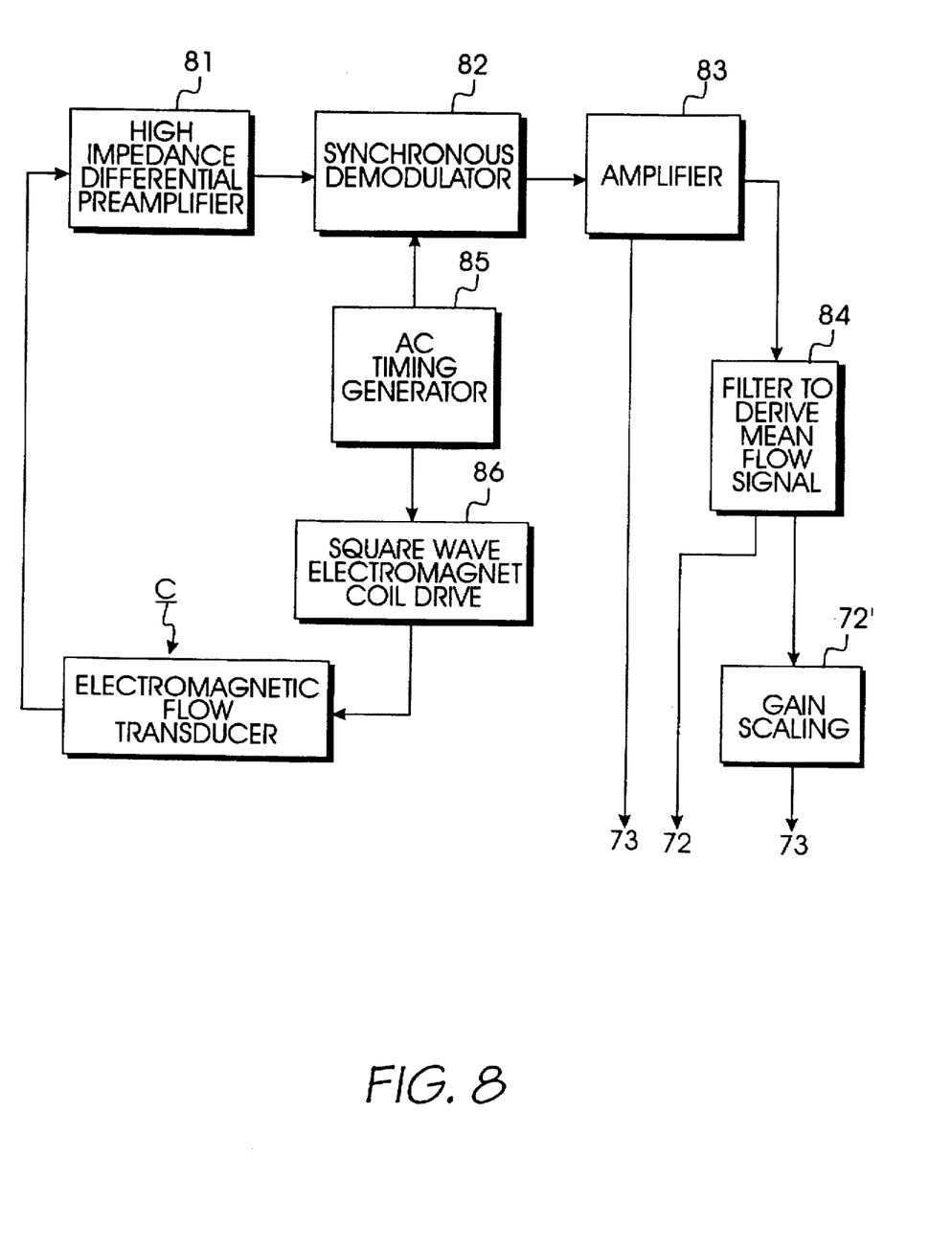
FIG. 8 is a block diagram illustrating the flow board with magnetic drive unit of FIG. 7.

Front panel digital display unit 72, described further with respect to FIG. 8, has a three digit segmental digital display for displaying a value corresponding to mean blood flow. The DC input voltage from flow board unit 71 is proportional to propulsion pump blood flow. The DC voltage is scaled so the digital display readout is in flow units. Front panel digital display unit 72 outputs a scaled DC voltage indicative of a mean flow level to be displayed on pulsatile/mean waveform and alphanumeric display unit 73.

Pulsatile/mean waveform and alphanumeric display unit 73 has a three color display for displaying analog pulsatile updated waveforms with superimposed mean blood flow levels. Additionally, a resettable digital clock 74 for detecting elapsed time provides an elapsed time clock signal to pulsatile/mean waveform and alphanumeric display unit 73 for display on a clock display. Digital clock 74 has crystal controlled, battery powered, digital clock timing circuitry, a parallel elapsed time counter, and a front panel reset button. Pulsatile/mean waveform and alphanumeric display unit 73 receives the analog pulsatile blood flow signal, the mean blood flow signal, a blood pressure signal from an external pressure transducer (not shown), and a digital clock timing chain and a parallel digital elapsed time counter chain and computes, for display, scale levels for pulse rate and stroke volume, peak blood flow and systolic pulse blood pressure.

A high voltage power supply 75 provides positive and negative terminals for supplying a DC voltage to field plates 41 and 42 of blood pump A in order to generate the electric field potential $E_y$, needed for pump propulsion. Power supply 75 is controlled by a 16 bit binary signal output by microprocessor controller 76. Microprocessor controller 76 is programmed to modulate the high power supply voltage for obtaining a desired blood flow waveform. Front panel flow level control 77 provides a user the control needed to adjust a variable potentiometer for setting the high voltage level applied to field plates 41 and 42. This high voltage level is used to set the mean blood flow value. Bertan® has a compact precision bench top high voltage power supply, i.e., Model Series 230, that can be adapted for use as high voltage power supply 75 and front panel flow level control 77. The Series 230 would utilize a Bertan® 16 bit binary programming plug-in card interfaced with microprocessor controller 76.

Referring now to FIG. 8, flow board with magnetic drive unit 71 will be further explained. The voltage proportional to the velocity of blood flow, and therefore directly proportional to the volume rate of flow of blood passing through electromagnetic transducer C, is input and amplified by a high impedance differential preamplifier 81. The amplified signal output from preamplifier 81 is demodulated by synchronous demodulator 82 in response to a timing signal output by AC timing generator 85. The demodulated output signal from synchronous demodulator 82 is amplified by amplifier 83 and output as the analog pulsatile blood flow signal input to pulsatile/mean waveform and alpha numeric display unit 73. The demodulated output signal from synchronous demodulator 82 and amplified by amplifier 83 is also input to a low pass filter 84 which outputs the analog mean blood flow signal. The mean blood flow signal output by filter 84 drives the three digit segmented display on front panel digital display unit 72. The analog mean blood flow signal output by filter 84 is scaled by gain scaling unit 72' of front panel digital display unit 72, to output the scaled DC voltage is indicative of the mean flow level to be displayed on pulsatile/mean waveform and alphanumeric display unit 73. Timing generator 85 also provides timing signals for controlling square wave electromagnet coil drive 86 for inducing an electromagnetic field in a core of an electromagnet in electromagnetic flow transducer C.

Figure 9:
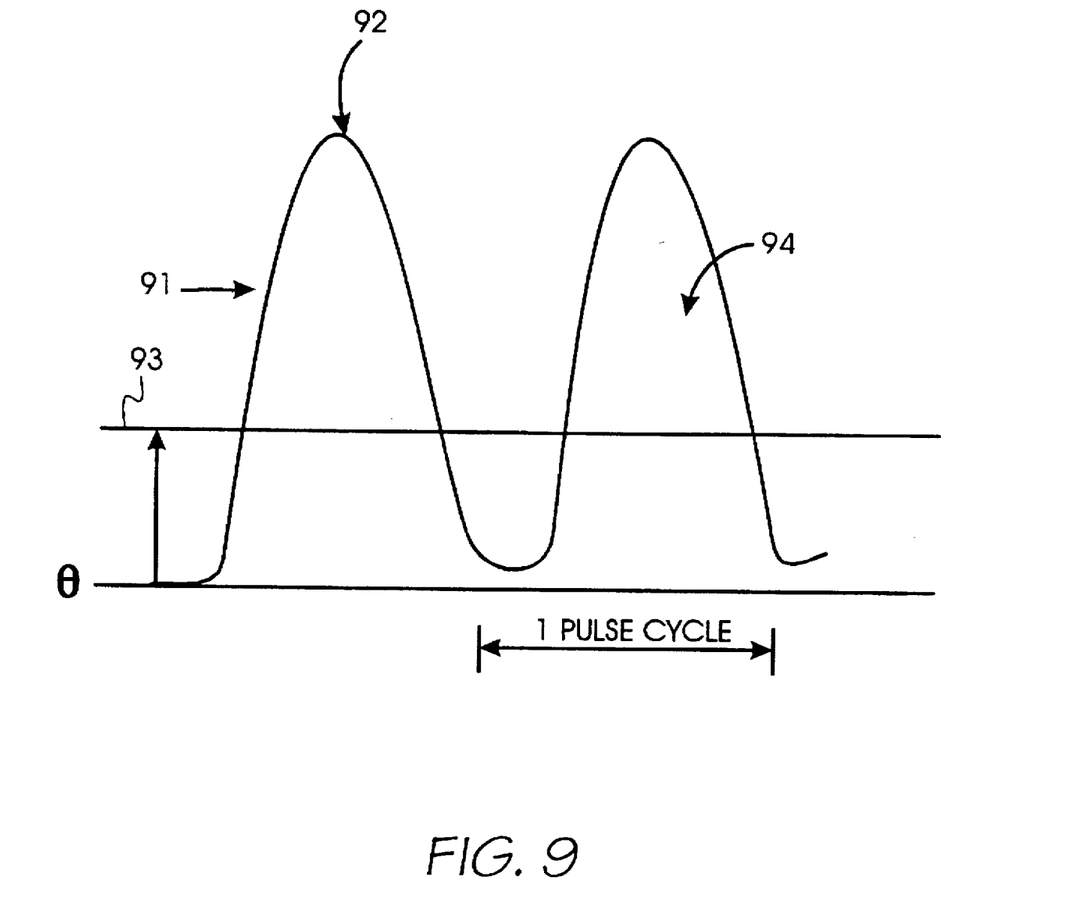
FIG. 9 illustrates a typical pulsatile blood flow waveform.

FIG. 9 illustrates a typical pulsatile blood flow waveform which is one of several waveforms generated by microprocessor controller 76 as selected by the user for display. It represent the most common pulsatile blood flow waveform pattern as seen from the output of the aortic valve of the heart in an adult. The quantitative values are also typical for this waveform. In FIG. 9, waveform 91 is the $E_v$ modulated pulsatile waveform; 92 represents a flow of 20 liters per minute peak flow at 170 mmHg systolic pulse pressure; 93 is the peak value representing 6 liters per minute mean blood flow; and the area between peak line 93 and the peak 92 of waveform 91 represents the stroke volume which, in the present case, is 86 milliliters per pulse, wherein the pulse cycle is equal to a 70 pulses per minute heart rate.

As shown in FIGS. 4 and 5, part of the ion propulsion blood pump consists of field plates 41 and 42 diametrically opposite each other. They are separated from each other by the insulating plastic walls of the tubular disposable member, and the conductive charge carrying fluid, i.e., blood. The $E_v$ field plates can be part of a capacitor type circuit with a suitable dielectric material therein. The input to these field plates is a high voltage applied across the field plates. Since the magnetic field β is constant and the electric field $E_v$ is variable, the propulsion force of the pump will follow the changes made in the electric field. Therefore, if the high voltage level input is modulated by the microprocessor software defining the pulsatile waveform desired, the output will be a pulsatile flow pattern duplicating the high voltage waveform pattern.

While there has been illustrated and described what has been considered to be a preferred embodiment of the present invention, it will be understood by those skilled in the art that various changes and modifications may be made, and equivalents may be substituted for elements thereof without departing from the true scope of the present invention. For example, electric field plates 41 and 42 may be formed by a high dielectric capacitor assembly. Additionally, one or both field plates 41 and 42 may be permanently mounted to tray 61.

What is claimed is:

1. A pulsatile blood pump having transducer means for housing a "C" shaped magnet providing a constant magnetic field between the north and south poles of said magnet, and tray means being insertable into a cavity of said transducer means, said pulsatile blood pump comprising:

a disposable insert for insertion into an extracorporeal circuit, said disposable insert comprising:
a central section having a rectangular outer surface and a constant tubular bore, said central section comprising a first electric field plate and a second electric field plate being disposed on diametrically opposite sides of said outer surface of said central section, said first and second electric field plates being respectively connected to negative and positive terminals of a voltage source for generating an electric field between said first and second electric field plates, said electric field being perpendicular to said magnetic field; and
first and second end sections each having a conical shape for enabling said disposable insert to be inserted into said extracorporeal circuit, said first and second end portions each having a constant tubular bore diametrically equal to the constant tubular bore of said central section for enabling blood to flow unimpaired through said disposable insert.

2. The pulsatile blood pump as set forth in claim 1, further comprising:
said first and second field plates each having a prong extending therefrom; and
a pair of sockets in said tray means for receiving said prongs in order to connect said first and second field plates respectively to said negative and positive terminals of said voltage source.

3. The pulsatile blood pump as set forth in claim 1, further comprising:
an electromagnetic flow transducer disposed in said extracorporeal circuit, downstream from said disposable insert, for detecting velocity of blood flowing from said disposable insert and generating a voltage proportional to the velocity of blood flow;
first means, responsive to said voltage, for displaying a value corresponding to mean blood flow and generating an analog pulsatile blood flow signal;
second means, responsive to said analog pulsatile blood flow signal, for displaying a waveform indicative of said analog pulsatile blood flow signal;
said voltage source generating a high direct current voltage, for connection to said first and second electric field plates, in response to binary control signal; and
control means for generating said binary control signal in response to a user selected one of a plurality of selectable pulsatile blood flow waveforms.

4. The pulsatile blood pump as set forth in claim 3, further comprising:
means, under user control, for adjusting said high direct current voltage for setting a desired mean blood flow rate.

5. The pulsatile blood pump as set forth in claim 3, said first means comprising:

square wave electromagnet coil drive means, responsive to a timing signal output by a timing generator, for generating a magnetic drive voltage for driving an electromagnet housed in said electromagnetic flow transducer;

high impedance differential amplification means for receiving said voltage generated by said electromagnetic flow transducer for outputting an amplified signal;

synchronous demodulator means, responsive to said timing signal, for outputting a demodulated signal by demodulating said amplified signal;

amplifier means for generating said pulsatile blood flow signal by amplifying said demodulated signal;

low pass filter means for generating a mean blood flow signal, said mean blood flow signal being supplied to a three segment display for display as said value corresponding to said mean blood flow; and scaling means for outputting a scaled voltage by scaling said mean blood flow signal, said scaled voltage being provided to said second means for display superimposed over said analog pulsatile blood flow waveform.

6. The pulsatile blood pump as set forth in claim 3, said second means comprising:

a resettable digital clock for generating a clock timing signal and a digital elapsed time counting chain; and a three color display for displaying said waveform indicative of said analog pulsatile blood flow signal.

7. The pulsatile blood pump as set forth in claim 5, further comprising:

a resettable digital clock for generating a clock timing signal and a digital elapsed time counting chain.

8. The pulsatile blood pump as set forth in claim 7, further comprised of said second means receiving said clock timing signal, said digital elapsed time counting chain, a signal representative of systolic blood pressure, said pulsatile blood flow signal and said scaled voltage and deriving a scaled pulse rate signal, a scaled stroke volume signal a scaled peak blood flow signal and a scaled blood pressure signal for display on an alphanumeric display.

9. A pulsatile blood pump having transducer means for housing a "C" shaped magnet providing a constant magnetic field between the north and south poles of said magnet, and tray means having a plurality of slide terminals, said tray means being insertable into a cavity of said transducer means, said pulsatile blood pump comprising:

a disposable insert for insertion into an extracorporeal circuit, said disposable insert comprising:

a central section having a rectangular outer surface and a constant tubular bore, said central section comprising a first electric field plate and a second electric field plate being disposed on diametrically opposite sides of said outer surface of said central section, said first and second electric field plates being respectively connected to negative and positive terminals of a voltage source for generating an electric field between said first and second electric field plates, said electric field being perpendicular to said magnetic field; and first and second end sections each having a conical shape for enabling said disposable insert to be inserted into said extracorporeal circuit, said first and second end portions each having a constant tubular bore diametrically equal to the constant tubular bore of said central section for enabling blood to flow unimpaired through said disposable insert;

an electromagnetic flow transducer disposed in said extracorporeal circuit, downstream from said disposable insert, for detecting velocity of blood flowing from said disposable insert and generating a voltage proportional to the velocity of blood flow;

first means, responsive to said voltage, for displaying a value corresponding to mean blood flow and generating an analog pulsatile blood flow signal;

second means, responsive to said analog pulsatile blood flow signal, for displaying a waveform indicative of said analog pulsatile blood flow signal;

said voltage source generating a high direct current voltage, for connection to said first and second electric field plates, in response to binary control signal; and control means for generating said binary control signal in response to a user selected one of a plurality of selectable pulsatile blood flow waveforms.

10. The pulsatile blood pump as set forth in claim 9, further comprising:

means, under user control, for adjusting said high direct current voltage for setting a desired mean blood flow rate.

11. The pulsatile blood pump as set forth in claim 9, said first means comprising:

square wave electromagnet coil drive means, responsive to a timing signal output by a timing generator, for generating a magnetic drive voltage for driving an electromagnet housed in said electromagnetic flow transducer;

high impedance differential amplification means for receiving said voltage generated by said electromagnetic flow transducer for outputting an amplified signal;

synchronous demodulator means, responsive to said timing signal, for outputting a demodulated signal by demodulating said amplified signal;

amplifier means for generating said pulsatile blood flow signal by amplifying said demodulated signal;

low pass filter means for generating a mean blood flow signal, said mean blood flow signal being supplied to a three segment display for display as said value corresponding to said mean blood flow; and scaling means for outputting a scaled voltage by scaling said mean blood flow signal, said scaled voltage being provided to said second means for display superimposed over said analog pulsatile blood flow waveform.

12. A method for pumping blood in an extracorporeal circuit, said method comprising the steps of:

generating a magnetic field;

generating an electric field perpendicular to said magnetic field, said step of generating an electric field comprising the steps of:

generating a binary control signal in response to a user selected one of a plurality of selectable pulsatile blood flow waveforms;

generating a high direct current voltage in response to said binary control signal; and adjusting a potentiometer to control said high direct current voltage for setting a desired mean blood flow rate;

exposing blood in said blood pump disposed in said extracorporeal circuit to said electric field and said magnetic field; and generating a Lorentz force on ions of said blood to pump said blood through said extracorporeal circuit in response to said electric field and said magnetic field being applied to ions in said blood.

13. The method as set forth in claim 12, further comprising the steps of:

generating a voltage proportional to a volume rate of flow of blood being pumped by said blood pump;

deriving an analog pulsatile blood flow signal and a mean blood flow signal in response to said voltage generated by said step of generating a voltage;

gain scaling said mean blood flow signal;

displaying a waveform indicative of said analog pulsatile blood flow signal; and superimposing said gain scaled blood flow signal over the displayed waveform.

14. The method as set forth in claim 12, said step of generating a binary control signal comprises generating a sixteen bit binary signal by a microprocessor control unit.

* * * * *